(12) United States Patent
Ni et al.

(10) Patent No.: US 11,388,244 B1
(45) Date of Patent: Jul. 12, 2022

(54) METHOD, DEVICE, AND PROGRAM PRODUCT FOR MANAGING COMPUTER SYSTEM

(71) Applicant: EMC IP Holding Company LLC, Hopkinton, MA (US)

(72) Inventors: Jiacheng Ni, Shanghai (CN); Min Gong, Shanghai (CN); Zijia Wang, Shanghai (CN); Zhen Jia, Shanghai (CN); Bin He, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/185,033

(22) Filed: Feb. 25, 2021

(30) Foreign Application Priority Data

Jan. 26, 2021 (CN) .......................... 202110103716.4

(51) Int. Cl.
| | | |
|---|---|---|
| *H04L 67/02* | (2022.01) | |
| *H04L 67/125* | (2022.01) | |
| *H04L 69/329* | (2022.01) | |
| *H04L 67/51* | (2022.01) | |
| *G06K 9/62* | (2022.01) | |
| *H04L 67/566* | (2022.01) | |
| *H04L 67/01* | (2022.01) | |

(52) U.S. Cl.
CPC ............ *H04L 67/16* (2013.01); *G06K 9/6215* (2013.01); *H04L 67/2833* (2013.01); *H04L 67/42* (2013.01)

(58) Field of Classification Search
USPC ......................................................... 709/223
See application file for complete search history.

(56) References Cited

U.S. PATENT DOCUMENTS 9,489,379 B1 * 11/2016 Wu ...................... G06F 11/0751
2005/0198200 A1 * 9/2005 Subramanian .......... H04L 41/50
709/218

(Continued)

OTHER PUBLICATIONS

J. Devlin et al., "BERT: Pre-training of Deep Bidirectional Transformers for Language Understanding," arXiv:1810.04805v2, May 24, 2019, 16 pages.
A. Vaswani et al., "Attention Is All You Need," arXiv:1706.03762v5, 31st Conference on Neural Information Processing Systems, Dec. 6, 2017, 15 pages.

(Continued)

*Primary Examiner* — Jude Jean Gilles
(74) *Attorney, Agent, or Firm* — Ryan, Mason & Lewis, LLP

(57) ABSTRACT

The present disclosure relates to a method, a device, and a program product for managing a computer system. One method includes: receiving a service request for the computer system, the service request describing an operation state of the computer system; respectively determining similarities between the service request and multiple historical service requests performed for the computer system, the multiple historical service requests respectively describing multiple historical operation states of the computer system; and determining, in response to determining that a similarity between the service request and a historical service request among the multiple historical service requests satisfies a predetermined similarity condition, a solution for processing the service request based on a pairing of the service request with the historical service request and a historical solution for processing the historical service request. Further, a corresponding device and a corresponding program product are provided.

20 Claims, 9 Drawing Sheets

(56) References Cited

U.S. PATENT DOCUMENTS

| | | | |
|---|---|---|---|
| 2008/0002602 A1* | 1/2008 | Chen | H04W 52/146 |
| | | | 370/318 |
| 2017/0220966 A1* | 8/2017 | Wang | G06Q 20/12 |
| 2017/0278012 A1* | 9/2017 | Prasad | H04L 43/16 |
| 2018/0012151 A1* | 1/2018 | Wang | G06Q 10/08 |
| 2018/0095772 A1* | 4/2018 | Wu | G06F 16/00 |
| 2018/0095807 A1* | 4/2018 | Wu | H04L 67/42 |
| 2019/0122760 A1* | 4/2019 | Wang | G06Q 10/1093 |
| 2019/0137288 A1* | 5/2019 | Rahematpura | G06Q 10/06 |
| 2019/0253517 A1* | 8/2019 | Ciano | H04L 67/327 |
| 2020/0314593 A1* | 10/2020 | Xu | H04W 4/024 |
| 2020/0410163 A1* | 12/2020 | Shah | G06F 9/30036 |
| 2020/0410423 A1* | 12/2020 | Kalia | G06Q 10/10 |

OTHER PUBLICATIONS

G. Neubig, "Neural Machine Translation and Sequence-to-sequence Models: A Tutorial," arXiv:1703.01619v1, Mar. 5, 2017, 65 pages.

S. Mani et al., "DeepTriage: Exploring the Effectiveness of Deep Learning for Bug Triaging," arXiv:1801.01275v1, Jan. 4, 2018, 11 pages.

T. Mikolov et al., "Efficient Estimation of Word Representations in Vector Space," arXiv:1301.3781v3, Sep. 7, 2013, 12 pages.

G. S. Manku et al., "Detecting Near-Duplicates for Web Crawling," Proceedings of the 16th International Conference on World Wide Web. May 8-12, 2007, 9 pages.

U.S. Appl. No. 16/983,051, filed in the name of Jiacheng Ni et al. on Aug. 3, 2020, and entitled "Method, Electronic Device, and Computer Program Product for Processing Information."

* cited by examiner

METHOD, DEVICE, AND PROGRAM PRODUCT FOR MANAGING COMPUTER SYSTEM

RELATED APPLICATION(S)

The present application claims priority to Chinese Patent Application No. 202110103716.4, filed Jan. 26, 2021, and entitled "Method, Device, and Program Product for Managing Computer System," which is incorporated by reference herein in its entirety.

FIELD

Implementations of the present disclosure relate to the management of computer systems and, more particularly, to a method, a device, and a computer program product for managing service requests for a computer system.

BACKGROUND

With the development of computer technology, a large number of computer systems can provide a wide variety of services. For example, computer systems can provide storage services, computing services, or other types of services to users. As a computer system operates, there may be a status such as failures, alerts, etc., in the computer system. In this case, a user of the computer system needs to send a service request to technical experts of a service center and describe the operation state of the computer system to seek technical support. It has become an important research topic as to how to find an effective failure handling solution based on the service request submitted by the user.

SUMMARY

Therefore, it is desirable to develop and implement a technical solution to manage a computer system in a more effective manner. Illustrative embodiments disclosed herein provide such a technical solution, which is able to handle service requests from users in a more convenient and effective manner, and thus to find accurate and effective failure handling solutions.

According to a first aspect of the present disclosure, a method for managing a computer system is provided. This method includes: receiving a service request for the computer system, the service request describing an operation state of the computer system; respectively determining similarities between the service request and multiple historical service requests performed for the computer system, the multiple historical service requests respectively describing multiple historical operation states of the computer system; and determining, in response to determining that a similarity between the service request and a historical service request among the multiple historical service requests satisfies a predetermined similarity condition, a solution for processing the service request based on a pairing of the service request with the historical service request and a historical solution for processing the historical service request.

According to a second aspect of the present disclosure, an electronic device is provided, including: at least one processor; a volatile memory; and a memory coupled to the at least one processor, wherein the memory has instructions stored therein which, when executed by the at least one processor, cause the device to execute the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings, FIG. 1 schematically illustrates a block diagram of an application environment in which example implementations of the present disclosure may be implemented.

DETAILED DESCRIPTION

Hereinafter, illustrative implementations of the present disclosure will be described in more detail with reference to the accompanying drawings. Although illustrative implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or the same objects. Other explicit and implicit definitions may also be included below.

Figure 1:
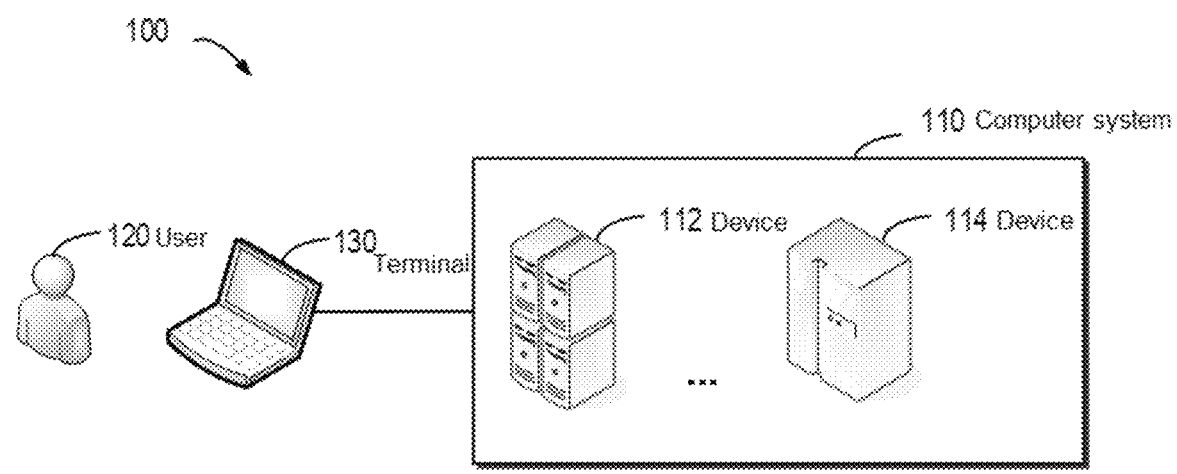

For ease of description, an application environment according to an example implementation of the present disclosure will be first described with reference to FIG. 1. FIG. 1 schematically illustrates a block diagram of application environment 100 in which example implementations of the present disclosure may be implemented. As shown in FIG. 1, computer system 110 may include a variety of types of devices 112, . . . , and 114. Depending on the type of services provided by computer system 110, computer system 110 may include a storage system, a computing system, a network system, and the like. User 120 of computer system 110 can connect to computer system 110 via terminal 130 to access the services provided by computer system 110.

For ease of description, an example implementation according to the present disclosure will be described below using a storage system as an example. Specifically, user 120 can write data to computer system 110 and read data from computer system 110 via terminal 130. Various abnormalities may occur during the operation of computer system 110. For example, when user 120 accesses data in computer system 110, there may be abnormalities such as connection failures and inability to read data. In this case, user 120 can seek help from technical experts at a service center in order to seek corresponding failure handling solutions.

User 120 can initiate a service request by telephone, email, message, etc. to describe the operation state of computer system 110. At this point, the technical experts at the service center need to find an appropriate failure handling solution based on their own experience and techniques such as keyword searching. However, such methods rely too much on human experience and it is difficult to find an accurate and effective failure handling solution.

At present, service request processing methods based on machine learning techniques have been proposed. Specifically, a machine learning model can be trained based on a large number of service requests submitted by users and corresponding failure handling solutions, and the trained machine learning model can be used to recommend corresponding failure handling solutions. However, on the one hand, this method requires collecting a large number of historical service requests and corresponding failure handling solutions as training data; and on the other hand, the accuracy of the recommended failure handling solutions is not satisfactory, and sometimes the recommended solutions cannot effectively solve the user's problems.

Figure 2:
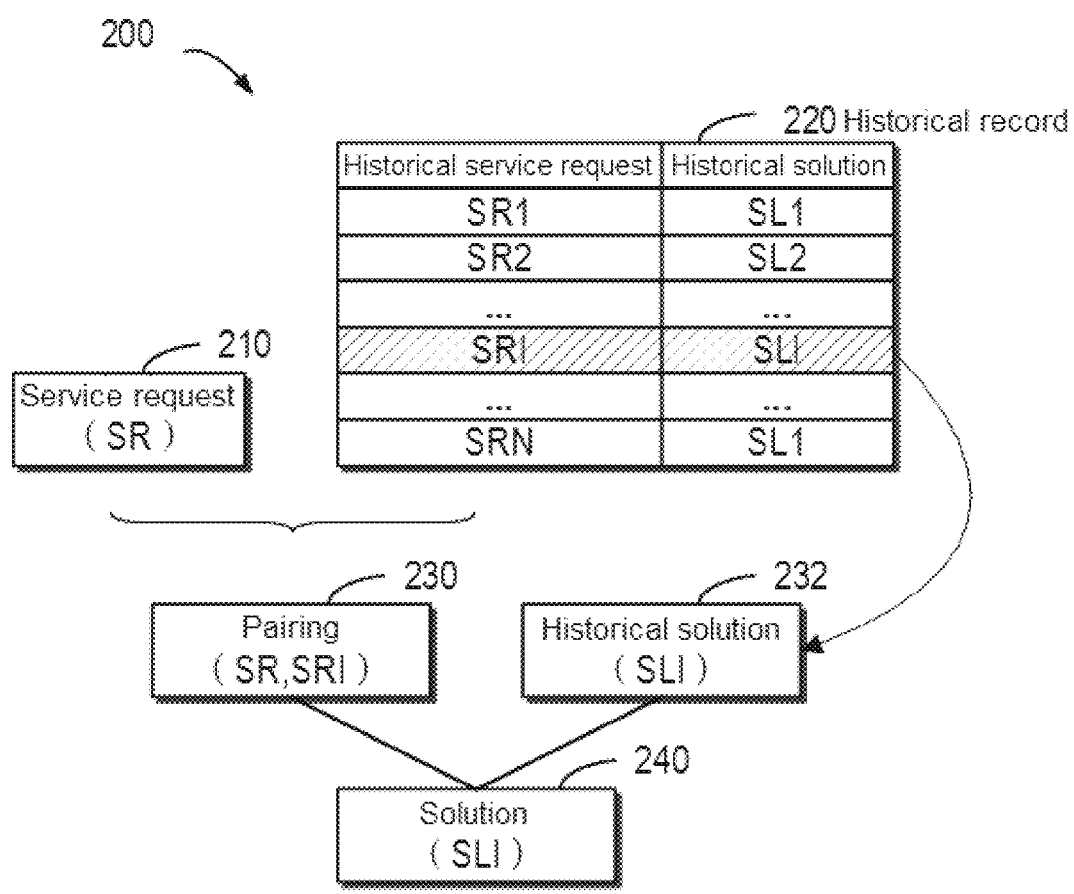
FIG. 2 schematically illustrates a block diagram of a process for managing a computer system according to example implementations of the present disclosure.

In order to address the aforementioned shortcomings, a method for managing computer system 110 is provided according to an example implementation of the present disclosure. An overview of an example implementation according to the present disclosure will first be described with reference to FIG. 2. FIG. 2 schematically illustrates a block diagram of process 200 for managing computer system 110 according to example implementations of the present disclosure. As shown in FIG. 2, service request 210 is a description of the current state of computer system 110 from the user. Historical record 220 includes a historical log for failure handling generated during the operation of computer system 110. For example, the first column shows historical service requests submitted by the user, and the second column shows historical solutions for processing various historical service requests. For example, the first row in historical record 220 indicates that solution SL1 was used to process service request SR1; the second row indicates that solution SL2 was used to process service request SR2; the shaded row indicates that solution SLI was used to process service request SRI; and the last row indicates that solution SL1 was used to process service request SRN.

According to an example implementation of the present disclosure, similarities between service request 210 and multiple historical service requests performed for computer system 110 can be determined respectively. One or more historical service requests (e.g., the shaded historical service request SRI in historical record 220) with a high similarity can be found from the multiple historical service requests. Further, solution 240 is determined based on pairing 230 of service request SR with historical service request SRI and historical solution 232 for processing historical service request SRI. Specifically, since the contents of service request SR and historical service request SRI are similar, historical solution SLI can be selected as solution 240 for processing service request 210.

With example implementations of the present disclosure, for similarity, differences in the language used by different users to describe the operation state of computer system 110 can be taken into account, and thus a solution that is capable of handling the current problem can be found in a more effective manner. Furthermore, historical solution 232 records various aspects of details of the failure handling process and thus can help provide the users with more varieties of failure handling templates.

Figure 3:
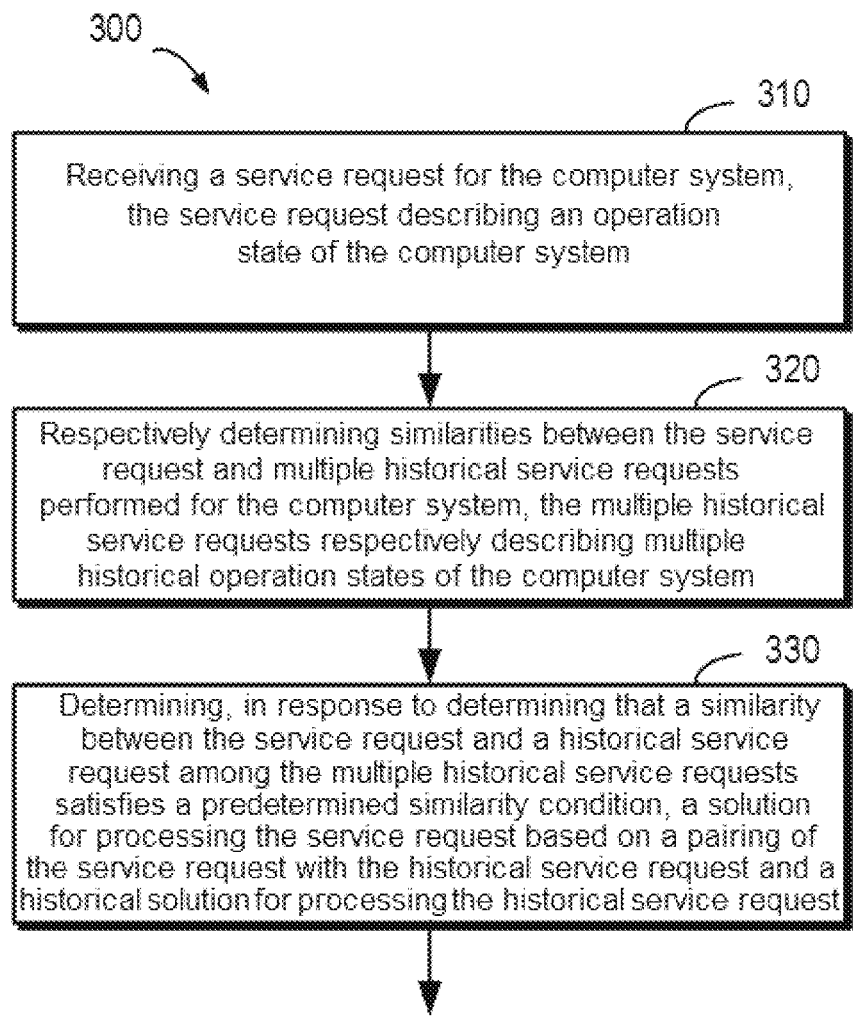
FIG. 3 schematically illustrates a flow chart of a method for managing a computer system according to example implementations of the present disclosure.

Hereinafter, the steps of a method according to an example implementation of the present disclosure will be described with reference to FIG. 3. FIG. 3 schematically illustrates a flow chart of method 300 for managing computer system 110 according to example implementations of the present disclosure. At block 310, service request 210 for computer system 110 is received. Here, service request 210 describes the operation state of the computer system. For example, service request 210 may be expressed in text and may include the following content: "After normal boot up, the computer system is started to access the application, but could not connect to the server, then an alert with failure number 001 is popped up . . . "

It will be understood that although the above schematically illustrates service request 210 provided in English text, according to an example implementation of the present disclosure, service request 210 may further include text descriptions in other languages (e.g., Chinese, Japanese, French, etc.). In this case, service request 210 can be processed based on a translation tool to convert service request 210 to the language used in the historical service requests and historical solutions recorded in historical record 220. Although the translation tool may make errors that in turn result in recommended solutions failing to accurately match service request 210, example implementations of the present disclosure can improve the user experience by providing the user with a potential solution to the problem, as opposed to not being able to provide any recommended solutions at all due to language barriers.

Alternatively and/or additionally, service request 210 may include a voice format, in which case the voice can be converted into text first, and then subsequent processing can be performed. In this way, service request 210 in multiple formats can be processed, which in turn facilitates the provision of services to users in multiple interactive ways.

At block 320, similarities between service request 210 and multiple historical service requests performed for computer system 110 are determined respectively, wherein the multiple historical service requests respectively describe multiple historical operation states of the computer system. The multiple historical service requests can be acquired from historical record 220 as shown in FIG. 2. It will be understood that only a simplified example of historical record 220 is schematically illustrated. Hereinafter, more details about historical record 220 will be described with reference to Table 1.

TABLE 1

Examples of historical record

| Identifier of historical service request | Title | Description | Identifier of historical solution |
|---|---|---|---|
| 67642 | Going to smartfail these nodes below, starting with node9 . . . | About restriping works of SetProtectPlus . . . | 4200 |
| . . . | . . . | . . . | . . . |
| 11743781 | When trying to delete the file via GUI, it crashes the computer in question's explorer.exe service . . . | XYZ Corp: STWD77: Attempts to open multiple files on different shares results in host system crash and Isilon hangs (locally) . . . | 46300 |
| 11743787 | Isilon cluster ABCLN7CLU01, node9, s/n - SN400- 201350- 0079 . . . | Requeue \| CE Onsite: Isilon cluster ABCLN7CLU01, Unhealthy boot disks (ada1), mirror is degraded or missing components . . . | 466200 |
| . . . | . . . | . . . | . . . |
| 14610551 | Need to create storage compatibilities class for n400 and n410 . . . | Need to create storage compatibilities class for n400 and n410 . . . | 479567 |

Table 1 shows an example of historical record 220, where each row indicates various types of information related to one historical service request. Specifically, the first column shows a unique identifier for each historical service request, the second column shows the title of each historical service request (a summary used to describe the operation state of computer system 110), the third column shows the description of each historical service request (specific information used to describe the operation state of computer system 110), and the fourth column shows the identifiers of historical solutions for processing various historical service requests. According to an example implementation of the present disclosure, the two parts of a historical service request, the title and the description, can be directly connected together in order to serve as the text content of the historical service request. It will be understood that Table 1 above is only schematic. Alternatively and/or additionally, the historical record may include only the description part of the historical service request, and the order of the various columns may vary.

According to an example implementation of the present disclosure, each historical service request in historical record 220 can be processed one by one in order to find a historical service request that has a high similarity to service request 210. Specifically, a comparison of service request 210 and the first historical service request in Table 1 can be processed first in order to determine the similarity between the two. It will be understood that since the text content may include complex syntactic structures, the similarity between the two service requests can be determined based on signature techniques. The signature of service request 210 (referred to as a service signature) and the signature of the historical service request (referred to as a historical service signature) can be determined, respectively. The above two signatures can be determined based on the same approach, and hereinafter, more details about determining the signatures will be described with reference to FIG. 4.

Figure 4:
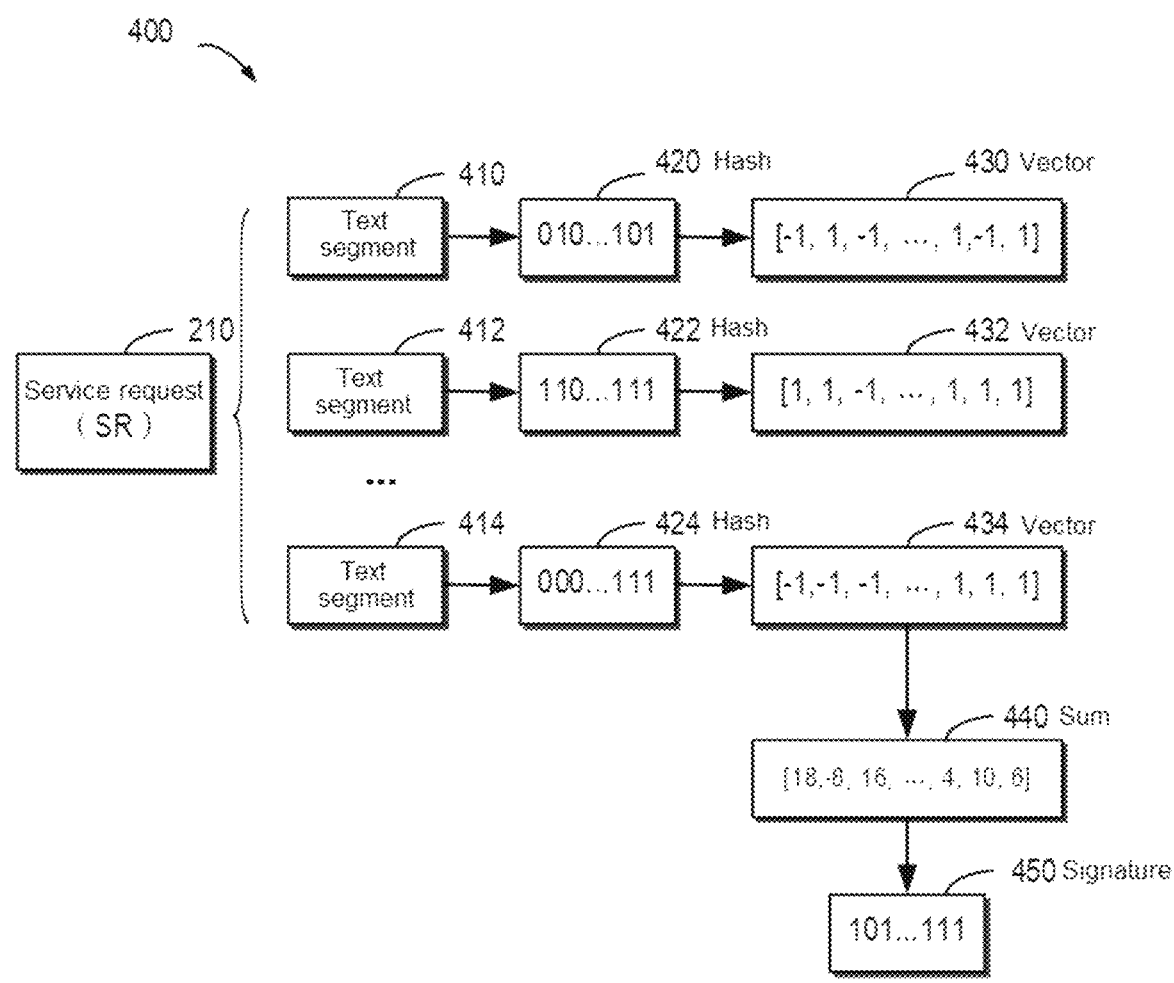
FIG. 4 schematically illustrates a block diagram of a process for acquiring a signature of a service request according to example implementations of the present disclosure.

FIG. 4 schematically illustrates a block diagram of process 400 for acquiring a signature of service request 210 according to example implementations of the present disclosure. As shown in FIG. 4, the text of service request 210 can be divided into multiple text segments 410, 412, . . . , and 414. Then, multiple hashes 420, 422, . . . , and 424 of the multiple text segments 410, 412, . . . , and 414 can be determined respectively based on multiple hash algorithms currently developed and/or to be developed in the future. According to an example implementation of the present disclosure, the MD5 algorithm (or other algorithms) can be selected to determine the hash of each text segment. In this case, each hash may be represented as a 64-bit binary code.

Further, multiple vectors 430, 432, . . . , and 434 can be established based on the multiple hashes 420, 422, . . . , and 424, respectively. Specifically, 0 in the hashes can be changed to −1, and 1 in the hashes can be left unchanged in order to generate a 64-dimensional vector. Next, the corresponding dimensions of the vectors 430, 432, . . . , and 434 can be summed in order to obtain sum 440 of the multiple vectors. Further, signature 450 of service request 210 can be determined based on this sum 440. With example implementations of the present disclosure, complex text descriptions can be segmented and processed, and the impact of each segment on the overall similarity can be considered comprehensively, thereby improving the accuracy of determining the similarity.

According to an example implementation of the present disclosure, the service signature and the historical service signature can be determined respectively based on the process shown in FIG. 4. Further, the similarity between service request 210 and the historical service request can be determined based on a distance between the service signature and the historical service signature. According to an example implementation of the present disclosure, the similarity between the two service requests can be determined based on the Hamming distance and/or other distances. With example implementations of the present disclosure, the determination of the similarity comparison between two complex texts can be converted into a mathematical problem of distance solving. In this way, the complexity of text comparison can be reduced and the efficiency of establishing pairings of similar service requests can be improved.

After the similarities between service request 210 and the historical service requests have been determined, a historical service request with a high similarity can be selected in order to construct a pairing with service request 210. Hereinafter, the description will return to FIG. 3 to provide more details. At block 330 in FIG. 3, in response to determining that a similarity between service request 210 and a historical service request among the multiple historical service requests satisfies a predetermined similarity condition, solution 240 for processing service request 210 is determined based on pairing 230 of service request 210 with historical service request and historical solution 232 for processing the historical service request.

According to an example implementation of the present disclosure, the predetermined similarity condition may include: the two service requests are considered similar if the distance between them is less than a threshold of 5 (or other values). It will be understood that there is no limit to how many pairings can be constructed here, and that a similarity condition can be set and one or more similar historical service requests can be found based on that condition. Here, the larger the value of the threshold, the more pairings are constructed, and the lower similarity is required between the two service requests in a pairing; the smaller the value of the threshold, the fewer pairings are constructed, and the higher similarity is required between the two service requests in a pairing. The size of the threshold can be adjusted based on the desired number of pairings in order to provide the user with a suitable number (e.g., up to 10) of recommended solutions.

According to an example implementation of the present disclosure, similar operations can be performed for each pairing. Specifically, a matching degree between historical solution 232 for processing the historical service request and service request 210 in pairing 230 can be determined. The matching degree here refers to whether historical solution 232 is suitable for processing service request 210. According to an example implementation of the present disclosure, the matching degree may be expressed as a value between 0 and 1. For example, a larger value indicates that historical solution 232 is more suitable for processing service request 210, and conversely, a smaller value indicates that historical solution 232 is less suitable for processing service request 210.

According to an example implementation of the present disclosure, the matching degree between historical solution 232 and service request 210 can be determined based on machine learning techniques. For example, a service model for outputting matching degrees can be acquired, and specifically, the service model may include a matching degree between a second solution for processing a second service request and a first service request. The service model can be trained based on multiple historical service requests and the corresponding historical solutions for those historical service requests in historical record 220. Hereinafter, more details related to a feature vector of a service model will be described with reference to FIG. 5.

Figure 5:
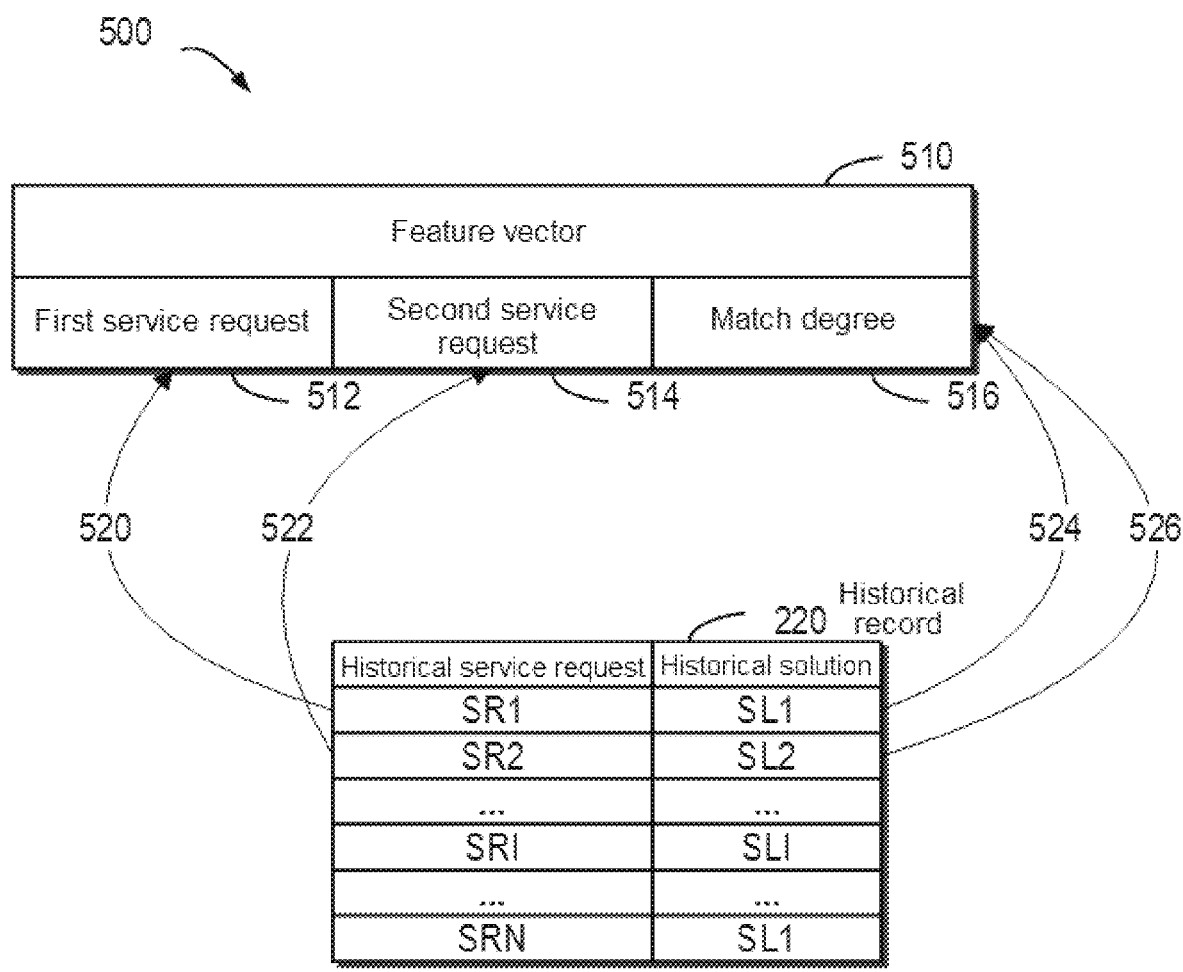
FIG. 5 schematically illustrates a block diagram of a process for determining a feature vector according to example implementations of the present disclosure.

FIG. 5 schematically illustrates a block diagram of process 500 for determining a feature vector of a service model according to example implementations of the present disclosure. Feature vector 510 may include three parts: first service request 512, second service request 514, and matching degree 516. As shown in FIG. 5, two solutions for processing two historical service requests can be acquired from historical record 220, respectively. As shown in the first and second rows of historical record 220, the matching degree between the second historical solution and the first historical service request can be determined based on a comparison of the two historical solutions. If the two historical solutions are the same, it can be determined that the second historical solution matches the first historical service request. If the two historical solutions are different, it can be determined that the second historical solution does not match the first historical service request.

According to an example implementation of the present disclosure, a feature vector for training the service model can be generated based on the first historical service request, the second historical service request, and the matching degree. As indicated by arrow 520, first service request 512 can be set based on historical service request SR1. As indicated by arrow 522, second service request 514 can be set based on historical service request SR2. As indicated by arrows 524 and 526, matching degree 516 can be set based on a comparison of historical services SL1 and SL2.

As shown in FIG. 5, the first row in historical record 220 indicates that the historical solution for processing historical service request SR1 is SL1. As shown in the second row, the historical solution for processing historical service request SR2 is SL2. According to an example implementation of the present disclosure, a value of "1" can be used to indicate "matching" and a value of "0" may be used to indicate "not matching." In the example in FIG. 5, the two historical service requests have different historical solutions (SL1≠SL2), and thus it can be determined that historical solution SL2 for processing historical service request SR2 is not suitable for processing historical service request SR1. In other words, the matching degree=0. In this case, the feature vector can be expressed as (SR1, SR2, 0).

Figure 6:
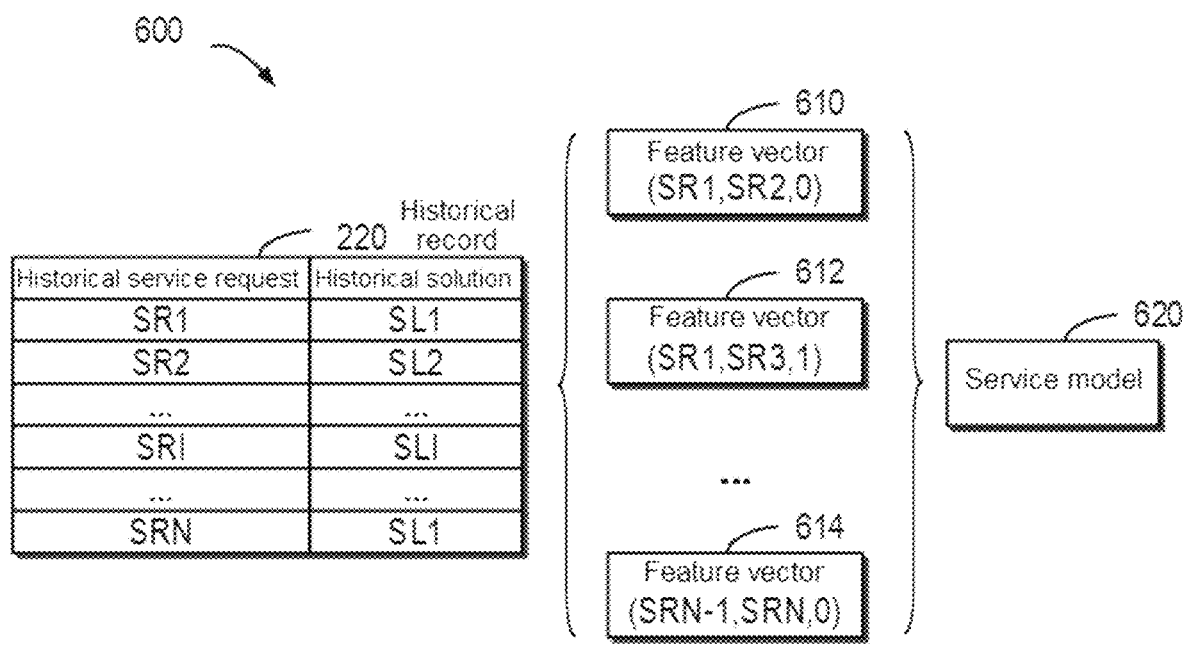
FIG. 6 schematically illustrates a block diagram of a process for training a service model according to example implementations of the present disclosure.

The pairing of any two historical service requests in historical record 220 can be processed in similar manners. Hereinafter, the process of determining a service model will be described with reference to FIG. 6. FIG. 6 schematically illustrates a block diagram of process 600 for training a service model according to example implementations of the present disclosure. As shown in FIG. 6, various types of data associated with pairings of historical service requests can be used to generate training data, and then the training data can be used to obtain the final service model 620. Any two historical service requests in historical record 220 can be combined in order to obtain a pairing of historical service requests.

At this point, feature vector 610 for training can be generated based on historical service requests SR1 and SR2 and the matching degree=0. First historical service request SR1 and the next historical service request SR3 in historical record 220 can be processed in a similar manner. Assuming that the historical solutions for processing historical service requests SR1 and SR3, respectively, are the same, another feature vector 612 for training can be determined. The pairing of any two historical service requests can be used in a similar manner to generate a corresponding feature vector, respectively. At this point, feature vectors 610, 612, . . . , and 614 can be generated based on the pairings of the historical service requests in historical record 220. Next, these feature vectors can be used to train service model 620. Assuming that historical record 220 includes n historical service requests, then n*n pairings can be generated. Table 2 schematically illustrates the pairings obtained by combining any two historical service requests in Table 1.

TABLE 2

Examples of pairing

| First service request | Second service request | Distance | Matching degree |
|---|---|---|---|
| xyzcorp isi01 21 process isi_ipmi_d of service isi_ipmi_d has failed to restart after multiple attempts | abcsupply dal-isilon 6 process isi_ipmi_d of service isi_ipmi_d has failed to restart after multiple attempts | 10 | 0 |
| . . . | . . . | . . . | . . . |
| uvwcorp seo ifscluster4 there is at least one smartpool at or over capacity | uvwcorp seo ifscluster2 how to disable dial-homes for there is at least one smartpool at or over capacity | 7 | 1 |
| defcorp 01 cluster is inaccessable due to ad time being out of sync by 18 minutes emc new service . . . | active directory integration permission errors emc new service request text Feb. 9, 2016 2:57 pm preferred . . . | 10 | 1 |

As shown in Table 2, the first column shows the first service request, the second column shows the second service request, the third column shows the distance between the two service requests, and the fourth column shows the matching degree between the second solution for the second service request and the first service request, i.e., whether the second solution is suitable for processing the first service request. The signatures of the first service request and the second service request can be determined based on the method described above with reference to FIG. 4, then the distance between the two signatures can be determined, and the matching degree between the two service requests can be determined based on the process described in FIG. 5.

With example implementations of the present disclosure, when generating the training data, it is only necessary to read historical record 220, and determine whether the corresponding historical solutions for the two historical service requests are the same. In this way, it can be determined in a convenient and fast manner whether the second historical solution matches the first historical service request. Compared to the existing technical solutions that require technical experts to manually label data, the example implementations of the present disclosure can significantly reduce the workload of generating training data and thus increase the efficiency of generating service model 620.

In order to improve the accuracy of service model 620, the generated training data can be divided into a training set and a test set, and the data in the training set can be used to train service model 620, and the data in the test set can be used to test whether the output results of the trained service model 620 are correct. According to an example implementation of the present disclosure, the division of the training set and the test set can be performed in the manner of Table 3 below.

TABLE 3

Classification of data sets

| Type | Total number | Number of data in training set | Number of data in test set |
|---|---|---|---|
| Historical service request | 452,825 | 330,000 | 122,825 |
| Labeled historical service request | 234,376 | 162,892 | 71,484 |
| Pairings of labeled historical service requests | 6,453,992 | 3,002,349 | 3,451,643 |

In Table 3, the first column shows the type of data, the second column shows the total number of pieces of data, and the third and fourth columns show the number of pieces of data in the training set and the test set, respectively. As shown in the first row of Table 3, 452,825 historical service requests may exist, and the training set and the test set may include 330,000 and 122,825 historical service requests, respectively. Similarly, the labeled historical service requests and the pairings of labeled historical service requests can be divided into the training set and the test set, respectively. In this case, the training set of labeled historical service requests would include 162,892 pieces of data, and the test set would include 71,484 pieces of data. It will be understood that the number of pairings is the square of the number of labeled historical service requests, which generates a large amount of data, and thus it is possible to select only part of the pairings for use as training data. For example, 6,453,992 pairings can be selected, and then the corresponding training set would include 3,002,349 pieces of data and the test set would include 3,451,643 pieces of data.

According to an example implementation of the present disclosure, based on the similarity between two historical service requests, the training data can be selected to be generated based on part of the pairings. A similarity between a first historical service request and a second historical service request among the multiple historical service requests can be first determined. The service model is trained based on the first historical service request and the second historical service request if it is determined that the similarity satisfies a predetermined selection condition. Table 4 below schematically illustrates the numbers of pairings generated when different similarity thresholds are set and the associated proportions.

TABLE 4

Pairings obtained according to different thresholds

| Distance threshold (>=3) | Number of pairings | Number/proportion of pairings with the same solution | Number/proportion of service requests covered by pairings | Number/proportion of service requests covered by pairings with the same solution |
| --- | --- | --- | --- | --- |
| <=15 | 43,554,172 | 19,129,677/43.92% | 62,717/87.73% | 50,121/70.11% |
| <=10 | 3,451,643 | 2,280,024/66.06% | 42,660/59.67% | 35,802/50.08% |
| <=8 | 970,533 | 677,543/69.81% | 33,710/47.15% | 27,851/38.96% |
| <=5 | 99,912 | 70,559/70.62% | 15,195/21.26% | 12,062/16.87% |

The first column in Table 4 indicates the similarity threshold used to select a pairing. It will be understood that the higher the similarity the lower the number of pairings, and the lower the similarity the higher the number of pairings. When similarity is expressed with distance, a greater distance indicates a lower similarity, and conversely, a smaller distance indicates a higher similarity. The second column in Table 4 indicates the number of pairings obtained based on the distance threshold, and the third column indicates the number/proportion of pairings with the same solution. As shown in Table 4, the smaller the distance the higher this proportion, which indicates the higher the proportion of two historical service requests sharing the same solution. The fourth column in Table 4 indicates the number/proportion of service requests covered by pairings, and the smaller the distance the lower the proportion. The fifth column in Table 4 indicates the number/proportion of service requests covered by pairings with the same solutions, and the smaller the distance the lower this proportion.

According to an example implementation of the present disclosure, the training data can be generated based on the different distance thresholds shown in Table 4. It will be understood that a larger distance threshold indicates that a smaller similarity between two historical service requests is allowed, and then a larger number of pairings can be obtained and thus a larger amount of training data can be generated. Although a large amount of training data can cover more cases, there may be implications in terms of the amount of computation and the accuracy of the service model. A smaller distance threshold indicates that a higher similarity between two historical service requests is required, and then a smaller number of pairings can be obtained and thus a smaller amount of training data can be generated. This will help reduce the amount of computation and improve the precision of the service model; however, there may be cases where recommended solutions cannot be given for some service requests 210. According to an example implementation of the present disclosure, a balance can be made between the above two aspects, and the service model can be controlled by setting a similarity condition (e.g., a distance threshold).

It will be understood that all the training data used to train the service model can be acquired directly from historical record 220 during this training process. The trained service model 620 obtained in this manner may include a large number of solutions accumulated by the technical experts in processing similar service requests. Further, when similar service requests are subsequently encountered, a solution suitable for processing the current service request 210 can be determined directly from the large number of solutions accumulated historically.

It will be understood that service model 620 here is obtained based on training with historical data and can adequately reflect the rich and correct historical experiences of the technical experts in processing historical service requests. At this point, based on these historical experiences, a solution suitable for processing service request 210 can be quickly found from the set of historical experiences.

Figure 7:
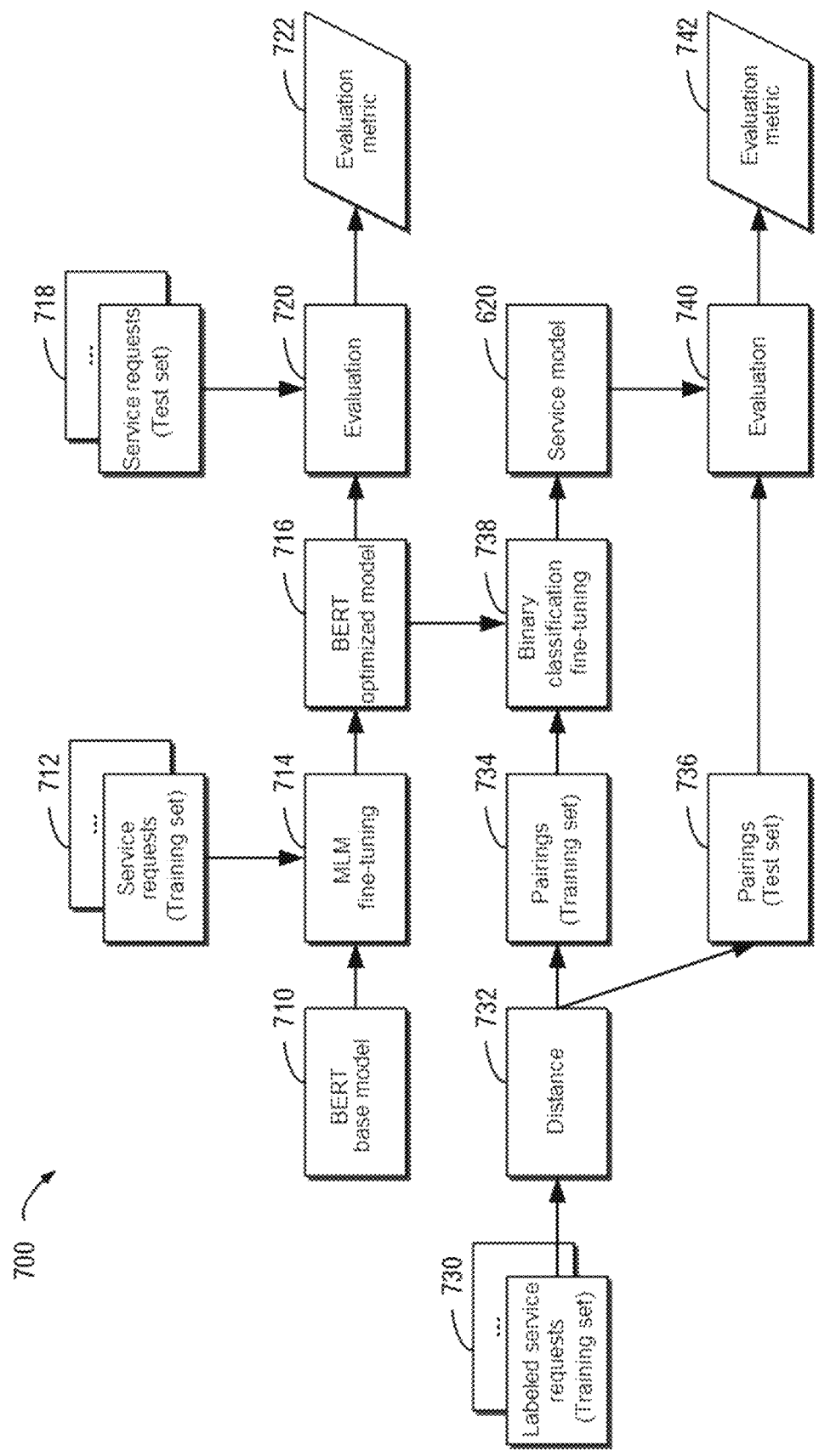
FIG. 7 schematically illustrates a block diagram of a process for acquiring a service model based on machine learning techniques according to example implementations of the present disclosure.

Hereinafter, the process for acquiring a service model will be described with reference to FIG. 7. FIG. 7 schematically illustrates a block diagram of process 700 for acquiring service model 620 based on machine learning techniques according to example implementations of the present disclosure. According to an example implementation of the present disclosure, service model 620 can be generated using a converter-based bidirectional encoder representation (BERT) model. As shown in FIG. 7, BERT base model 710 that has been generated based on multiple corpora can be acquired, and further, service requests 712 in the training set can be used to perform MLM (Mask Language Modeling) fine-tuning 714 operations for BERT base model 710 in order to obtain BERT optimized model 716. Further, service requests 718 in the test set can be used to perform evaluation 720 operation for BERT optimized model 716, so as to determine evaluation metric 722 of BERT optimized model 716.

Further, distance 732 between any two pairings of labeled service requests 730 in the training set can be determined so that multiple pairings for training service model 620 can be determined. The multiple pairings can be divided into pairings 734 in a training set and pairings 736 in a test set. Further, BERT optimized model 716 can be further trained using pairings 734 in the training set to perform binary classification fine-tuning 738, thus generating the final service model 620. Pairings 736 in the test set can be used to perform evaluation 740 operations for service model 620 in order to determine evaluation metric 742 of service model 620.

It will be understood that the purpose of evaluations 720 and 740 in FIG. 7 is to measure the quality of various models rather than to determine service model 620 itself, and thus the evaluation step described above may be omitted. With example implementations of the present disclosure, multiple adjustments can be performed for the BERT base model so that the final service model 620 can realistically reflect the historical experiences of various kinds of failure handling ever performed in computer system 110.

Figure 8:
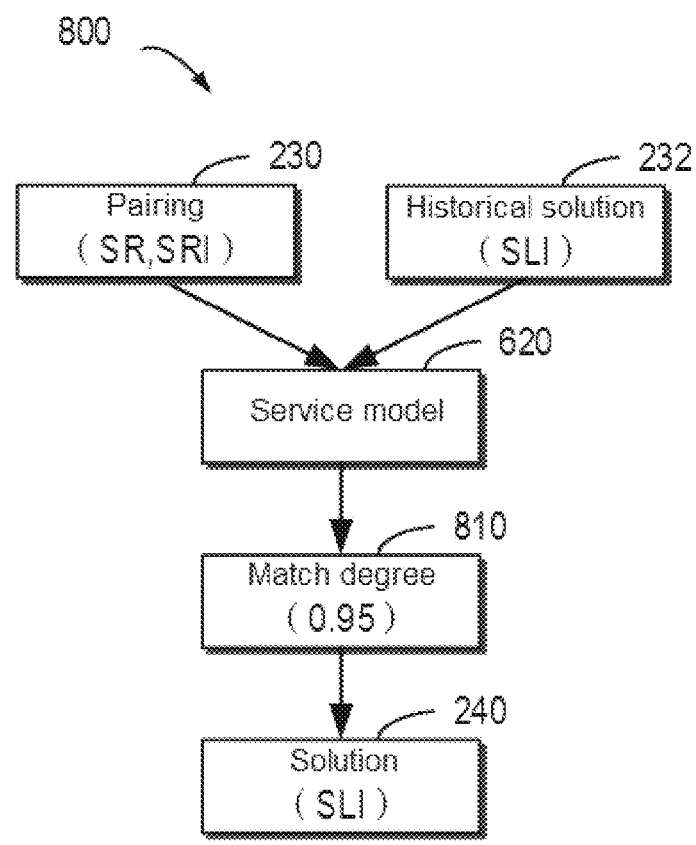
FIG. 8 schematically illustrates a block diagram of a process for determining, based on a service model, a solution for processing a service request according to example implementations of the present disclosure.

According to an example implementation of the present disclosure, the trained service model 620 can be used to recommend a suitable solution for the current service request 210. Hereinafter, more details about the use of service model 620 will be described with reference to FIG. 8. FIG. 8 schematically illustrates a block diagram of process 800 for determining, based on a service model, a solution for processing a service request according to example implementations of the present disclosure. As shown in FIG. 8, the following can be input to service model 620: pairing 230 of service request 210 with a historical service request which has a high similarity with the service request, and historical solution 232 for processing that historical service request. At this point, service model 620 can output matching degree 810 between historical solution 232 and service request 210. If it is determined that matching degree 810 satisfies a predetermined matching condition (e.g., above a threshold of 0.9), historical solution 232 is identified as solution 240 for processing service request 210.

With example implementations of the present disclosure, the historical experience recorded in service model 620 can be used to more accurately and effectively recommend a solution for processing the current service request 210.

The process of determining a recommended solution based on the pairing of service request 210 with a similar historical service request has been described above. Alternatively and/or additionally, multiple (e.g., 10) historical service requests with high similarity can be selected, and then 10 pairings can be constructed. Similar processing can be performed for each pairing in order to determine the matching degrees between the 10 historical solutions and service request 210, respectively. The 10 historical solutions can be ranked in a descending order of matching degree, and the top 5 (or other numbers) historical solutions can be selected to be recommended to the user of computer system 110.

According to an example implementation of the present disclosure, after a solution suitable for processing service request 210 has been determined, the determined solution can be provided to the user submitting service request 210 for use in guiding that user's operation. It will be understood that the solution provided herein is the correct solution that has been performed in the past and that can solve the problem in computer system 110, and that this solution includes various details regarding the processing steps. In this way, the user can perform the operations according to the steps recorded in the recommended solution in order to eliminate failures in computer system 110.

With example implementations of the present disclosure, part of historical solutions that are not suitable for processing service request 210 can be initially filtered out based on similarities between service request 210 and historical service requests. Further, based on historical experiences, service model 620 can determine with greater precision whether historical solution 232 for processing a historical service request in a pairing is suitable for processing the current service request 210. In this way, the accuracy of recommendation can be improved, and then a solution can be provided that is more suitable for processing the current service request 210.

It will be understood that although the process for managing a computer system has been described above using only the example of a service request submitted in the event of a failure in the storage system. Alternatively and/or additionally, the example implementations according to the present disclosure can be executed in other computer systems. For example, method 300 described above can be performed in computing systems, communication systems, and/or other types of computer systems.

Examples of the method according to the present disclosure have been described in detail above with reference to FIGS. 2 to 8, and implementations of a corresponding apparatus will be described below. According to an example implementation of the present disclosure, an apparatus for managing a computer system is provided. The apparatus includes: a receiving module configured to receive a service request for the computer system, the service request describing an operation state of the computer system; a determining module configured to respectively determine similarities between the service request and multiple historical service requests performed for the computer system, the multiple historical service requests respectively describing multiple historical operation states of the computer system; and a determining module configured to determine, in response to determining that a similarity between the service request and a historical service request among the multiple historical service requests satisfies a predetermined similarity condition, a solution for processing the service request based on a pairing of the service request with the historical service request and a historical solution for processing the historical service request. According to example implementations of the present disclosure, this apparatus further includes modules for performing other steps in method 300 described above.

Figure 9:
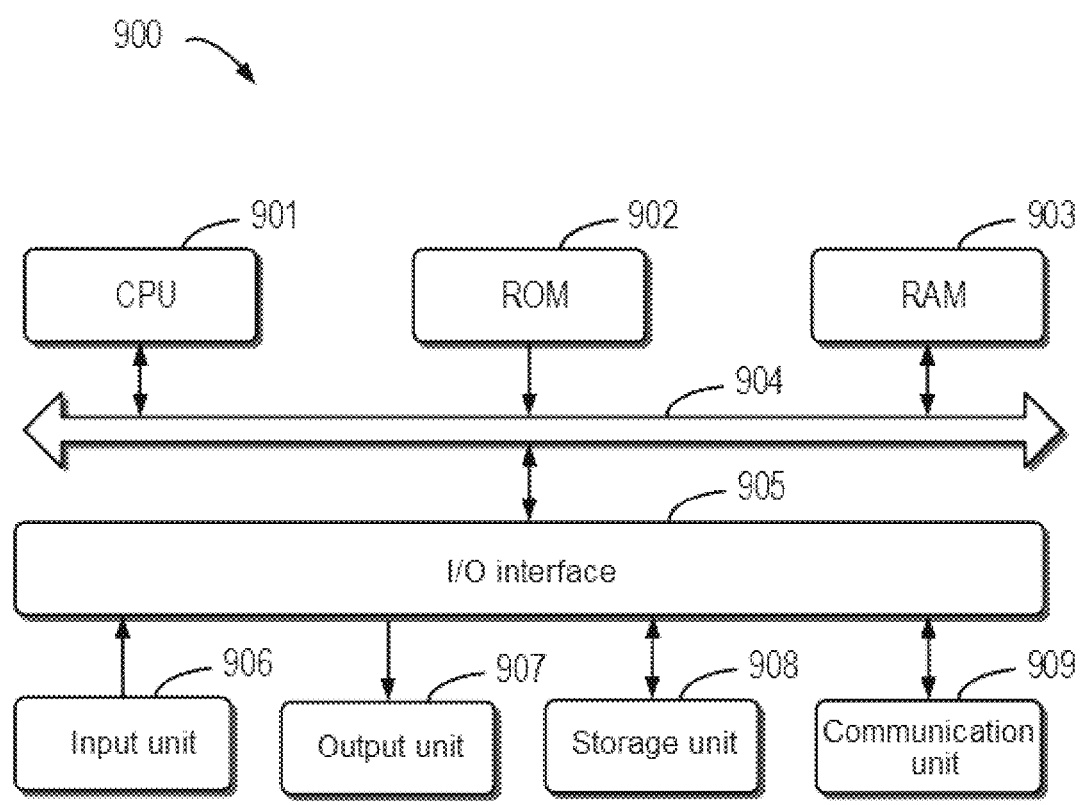
FIG. 9 schematically illustrates a block diagram of a device for managing a computer system according to example implementations of the present disclosure.

FIG. 9 schematically illustrates a block diagram of device 900 for managing data patterns according to example implementations of the present disclosure. As shown in the figure, device 900 includes central processing unit (CPU) 901 that may perform various appropriate actions and processing according to a computer program instruction stored in read-only memory (ROM) 902 or a computer program instruction loaded from storage unit 908 into random access memory (RAM) 903. Various programs and data required by the operation of device 900 may also be stored in RAM 903. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices via a computer network such as the Internet and/or various telecommunication networks.

The various processes and processing described above, such as method 300, may be performed by CPU 901. For example, in some implementations, method 300 may be implemented as a computer software program that is tangibly included in a machine-readable medium, such as storage unit 908. In some implementations, part or all of the computer programs may be loaded and/or installed on device 900 via ROM 902 and/or communication unit 909. When the computer program is loaded into RAM 903 and executed by CPU 901, one or more steps of method 300 described above may be performed. Alternatively, in other implementations, CPU 901 may also be configured in any other suitable manner to implement the above-described process/method.

According to example implementations of the present disclosure, an electronic device is provided, including: at least one processor; a volatile memory; and a memory coupled to the at least one processor, wherein the memory has instructions stored therein which, when executed by the at least one processor, cause the device to execute a method for managing a computer system. This method includes: receiving a service request for the computer system, the service request describing an operation state of the computer system; respectively determining similarities between the service request and multiple historical service requests performed for the computer system, the multiple historical service requests respectively describing multiple historical operation states of the computer system; and determining, in response to determining that a similarity between the service request and a historical service request among the multiple historical service requests satisfies a predetermined similarity condition, a solution for processing the service request based on a pairing of the service request with the historical service request and a historical solution for processing the historical service request.

According to an example implementation of the present disclosure, respectively determining the similarities between the service request and the multiple historical service requests includes: for the historical service request among the multiple historical service requests, respectively determining a service signature of the service request and a historical service signature of the historical service request; and determining the similarity between the service request and the historical service request based on a distance between the service signature and the historical service signature.

According to an example implementation of the present disclosure, the service request includes a text description of the operation state, and determining the service signature of the service request includes: respectively determining multiple hashes of multiple text segments in the text description; establishing multiple vectors respectively based on the multiple hashes; and determining the service signature of the service request based on the sum of the multiple vectors.

According to an example implementation of the present disclosure, determining the solution for processing the service request includes: determining a matching degree between the historical solution and the service request; and identifying, in response to determining that the matching degree satisfies a predetermined matching condition, the historical solution as the solution for processing the service request.

According to an example implementation of the present disclosure, determining the matching degree between the historical solution and the service request includes: acquiring a service model, the service model including a matching degree between a second solution for processing a second service request and a first service request; and determining the matching degree between the service request and the historical solution based on the service request, the historical service request, and the service model.

According to an example implementation of the present disclosure, acquiring the service model includes: determining a similarity between a first historical service request and a second historical service request among the multiple historical service requests; and training the service model based on the first historical service request and the second historical service request in response to determining that the similarity satisfies a predetermined selection condition.

According to an example implementation of the present disclosure, training the service model includes: acquiring a first historical solution for processing the first historical service request and a second historical solution for processing the second historical service request; determining the matching degree between the second historical solution and the first historical service request based on a comparison between the first historical solution and the second historical solution; and training the service model based on the first historical service request, the second historical service request, and the matching degree.

According to an example implementation of the present disclosure, determining the matching degree between the second historical solution and the first historical service request includes at least any one of: determining that the second historical solution matches the first historical service request in response to determining that the first historical solution is the same as the second historical solution; and determining that the second historical solution does not match the first historical service request in response to determining that the first historical solution is different from the second historical solution.

According to an example implementation of the present disclosure, the computer system includes a storage system, and the operation state includes a text description of failures that occur in the storage system.

According to an example implementation of the present disclosure, the method further includes: providing, to a user submitting the service request, the solution for use in guiding the user in processing the service request.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided, the computer-readable medium storing machine-executable instructions which, when being executed by at least one processor, cause the at least one processor to implement the method according to the present disclosure.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to multiple implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, and to otherwise enable persons of ordinary skill in the art to understand the implementations disclosed here.

What is claimed is:

1. A method for managing a computer system, comprising:
    receiving a service request for the computer system, the service request describing an operation state of the computer system;
    respectively determining similarities between the service request and multiple historical service requests performed for the computer system, the multiple historical service requests respectively describing multiple historical operation states of the computer system; and
    determining, in response to determining that a similarity between the service request and a historical service request among the multiple historical service requests satisfies a predetermined similarity condition, a solution for processing the service request based on a pairing of the service request with the historical service request and a historical solution for processing the historical service request;
    wherein the service request comprises a text description of the operation state, and determining the similarity between the service request and a given one of the multiple historical service requests comprises:
    respectively determining multiple hashes of multiple text segments in the text description of the operation state; and
    utilizing the multiple hashes to determine the similarity between the service request and the historical service request.

2. The method according to claim 1, wherein respectively determining the similarities between the service request and the multiple historical service requests comprises: for the historical service request among the multiple historical service requests,
   respectively determining a service signature of the service request and a historical service signature of the historical service request; and
   determining the similarity between the service request and the historical service request based on a distance between the service signature and the historical service signature.

3. The method according to claim 2, wherein determining the service signature of the service request comprises:
   establishing multiple vectors respectively based on the multiple hashes; and
   determining the service signature of the service request based on the sum of the multiple vectors.

4. The method according to claim 1, wherein determining the solution for processing the service request comprises:
   determining a matching degree between the historical solution and the service request; and
   identifying, in response to determining that the matching degree satisfies a predetermined matching condition, the historical solution as the solution for processing the service request.

5. The method according to claim 4, wherein determining the matching degree between the historical solution and the service request comprises:
   acquiring a service model, the service model comprising a matching degree between a second solution for processing a second service request and a first service request; and
   determining the matching degree between the service request and the historical solution based on the service request, the historical service request, and the service model.

6. The method according to claim 5, wherein acquiring the service model comprises:
   determining a similarity between a first historical service request and a second historical service request among the multiple historical service requests; and
   training the service model based on the first historical service request and the second historical service request in response to determining that the similarity satisfies a predetermined selection condition.

7. The method according to claim 6, wherein training the service model comprises:
   acquiring a first historical solution for processing the first historical service request and a second historical solution for processing the second historical service request;
   determining the matching degree between the second historical solution and the first historical service request based on a comparison between the first historical solution and the second historical solution; and
   training the service model based on the first historical service request, the second historical service request, and the matching degree.

8. The method according to claim 7, wherein determining the matching degree between the second historical solution and the first historical service request comprises at least any one of:
   determining that the second historical solution matches the first historical service request in response to determining that the first historical solution is the same as the second historical solution; and
   determining that the second historical solution does not match the first historical service request in response to determining that the first historical solution is different from the second historical solution.

9. The method according to claim 1, further comprising: providing, to a user submitting the service request, the solution for use in guiding the user in processing the service request.

10. The method according to claim 1, wherein the computer system comprises a storage system, and the operation state comprises a text description of failures that occur in the storage system.

11. An electronic device, comprising:
    at least one processor;
    a volatile memory; and
    a memory coupled to the at least one processor, wherein the memory has instructions stored therein which, when executed by the at least one processor, cause the device to execute a method for managing a computer system, the method comprising:
    receiving a service request for the computer system, the service request describing an operation state of the computer system;
    respectively determining similarities between the service request and multiple historical service requests performed for the computer system, the multiple historical service requests respectively describing multiple historical operation states of the computer system; and
    determining, in response to determining that a similarity between the service request and a historical service request among the multiple historical service requests satisfies a predetermined similarity condition, a solution for processing the service request based on a pairing of the service request with the historical service request and a historical solution for processing the historical service request;
    wherein the service request comprises a text description of the operation state, and determining the similarity between the service request and a given one of the multiple historical service requests comprises:
    respectively determining multiple hashes of multiple text segments in the text description of the operation state; and
    utilizing the multiple hashes to determine the similarity between the service request and the historical service request.

12. The device according to claim 11, wherein respectively determining the similarities between the service request and the multiple historical service requests comprises: for the historical service request among the multiple historical service requests,
    respectively determining a service signature of the service request and a historical service signature of the historical service request; and
    determining the similarity between the service request and the historical service request based on a distance between the service signature and the historical service signature.

13. The device according to claim 12, wherein determining the service signature of the service request comprises:
    establishing multiple vectors respectively based on the multiple hashes; and
    determining the service signature of the service request based on the sum of the multiple vectors.

14. The device according to claim 11, wherein determining the solution for processing the service request comprises:

determining a matching degree between the historical solution and the service request; and identifying, in response to determining that the matching degree satisfies a predetermined matching condition, the historical solution as the solution for processing the service request.

15. The device according to claim 14, wherein determining the matching degree between the historical solution and the service request comprises:

acquiring a service model, the service model comprising a matching degree between a second solution for processing a second service request and a first service request; and determining the matching degree between the service request and the historical solution based on the service request, the historical service request, and the service model.

16. The device according to claim 15, wherein acquiring the service model comprises:

determining a similarity between a first historical service request and a second historical service request among the multiple historical service requests; and training the service model based on the first historical service request and the second historical service request in response to determining that the similarity satisfies a predetermined selection condition.

17. The device according to claim 16, wherein training the service model comprises:

acquiring a first historical solution for processing the first historical service request and a second historical solution for processing the second historical service request;

determining the matching degree between the second historical solution and the first historical service request based on a comparison between the first historical solution and the second historical solution; and training the service model based on the first historical service request, the second historical service request, and the matching degree.

18. The device according to claim 17, wherein determining the matching degree between the second historical solution and the first historical service request comprises at least any one of:

determining that the second historical solution matches the first historical service request in response to determining that the first historical solution is the same as the second historical solution; and determining that the second historical solution does not match the first historical service request in response to determining that the first historical solution is different from the second historical solution.

19. The device according to claim 11, wherein the computer system comprises a storage system, and the operation state comprises a text description of failures that occur in the storage system, and the method further comprises: providing, to a user submitting the service request, the solution for use in guiding the user in processing the service request.

20. A computer program product that is tangibly stored on a non-transitory computer-readable medium and comprises machine-executable instructions, wherein the machine-executable instructions are used to perform a method for managing a computer system, the method comprising:

receiving a service request for the computer system, the service request describing an operation state of the computer system;

respectively determining similarities between the service request and multiple historical service requests performed for the computer system, the multiple historical service requests respectively describing multiple historical operation states of the computer system; and determining, in response to determining that a similarity between the service request and a historical service request among the multiple historical service requests satisfies a predetermined similarity condition, a solution for processing the service request based on a pairing of the service request with the historical service request and a historical solution for processing the historical service request;

wherein the service request comprises a text description of the operation state, and determining the similarity between the service request and a given one of the multiple historical service requests comprises:

respectively determining multiple hashes of multiple text segments in the text description of the operation state; and utilizing the multiple hashes to determine the similarity between the service request and the historical service request.

* * * * *